United States Patent [19]

Newton

[11] Patent Number: 4,724,364
[45] Date of Patent: Feb. 9, 1988

[54] CRT CONTROL CIRCUIT

[75] Inventor: Anthony D. Newton, Le Vaud, Switzerland

[73] Assignee: Motorola, Inc., Schaumburg, Ill.

[21] Appl. No.: 835,850

[22] PCT Filed: Jun. 6, 1985

[86] PCT No.: PCT/GB85/00246
§ 371 Date: Feb. 6, 1986
§ 102(e) Date: Feb. 6, 1986

[87] PCT Pub. No.: WO85/05717
PCT Pub. Date: Dec. 19, 1985

[30] Foreign Application Priority Data
Jun. 6, 1984 [GB] United Kingdom ............... 8414451

[51] Int. Cl.$^4$ ............................................. H01J 29/52
[52] U.S. Cl. .................................... 315/383; 358/169
[58] Field of Search ................ 315/383, 381; 358/168, 358/169, 27, 74

[56] References Cited

U.S. PATENT DOCUMENTS

| | | | |
|---|---|---|---|
| 3,598,913 | 10/1971 | Janssen | 358/169 |
| 3,898,381 | 8/1975 | Amsen et al. | 358/243 |
| 4,126,884 | 11/1978 | Shanley, II | 358/27 |
| 4,277,798 | 7/1981 | Hinn | 358/33 |
| 4,318,034 | 3/1982 | Nakamura | 315/383 |
| 4,344,021 | 10/1982 | Johnston | 315/383 |
| 4,461,983 | 7/1984 | Lees | 315/383 |

FOREIGN PATENT DOCUMENTS 2441306 7/1980 France .................... 358/27

Primary Examiner—Theodore M. Blum
Assistant Examiner—David Cain
Attorney, Agent, or Firm—Michael D. Bingham

[57] ABSTRACT

A circuit for controlling a CRT including a control which monitors tube parameters and adjusts the nominal cut-off level of the tube cathode current accordingly, sensing when the control is near an extreme of its range of adjustment and responsive to the sensing to change a control signal applied to a grid of the tube so as to bring the nominal cut off level control loop within its range of adjustment.

7 Claims, 1 Drawing Figure

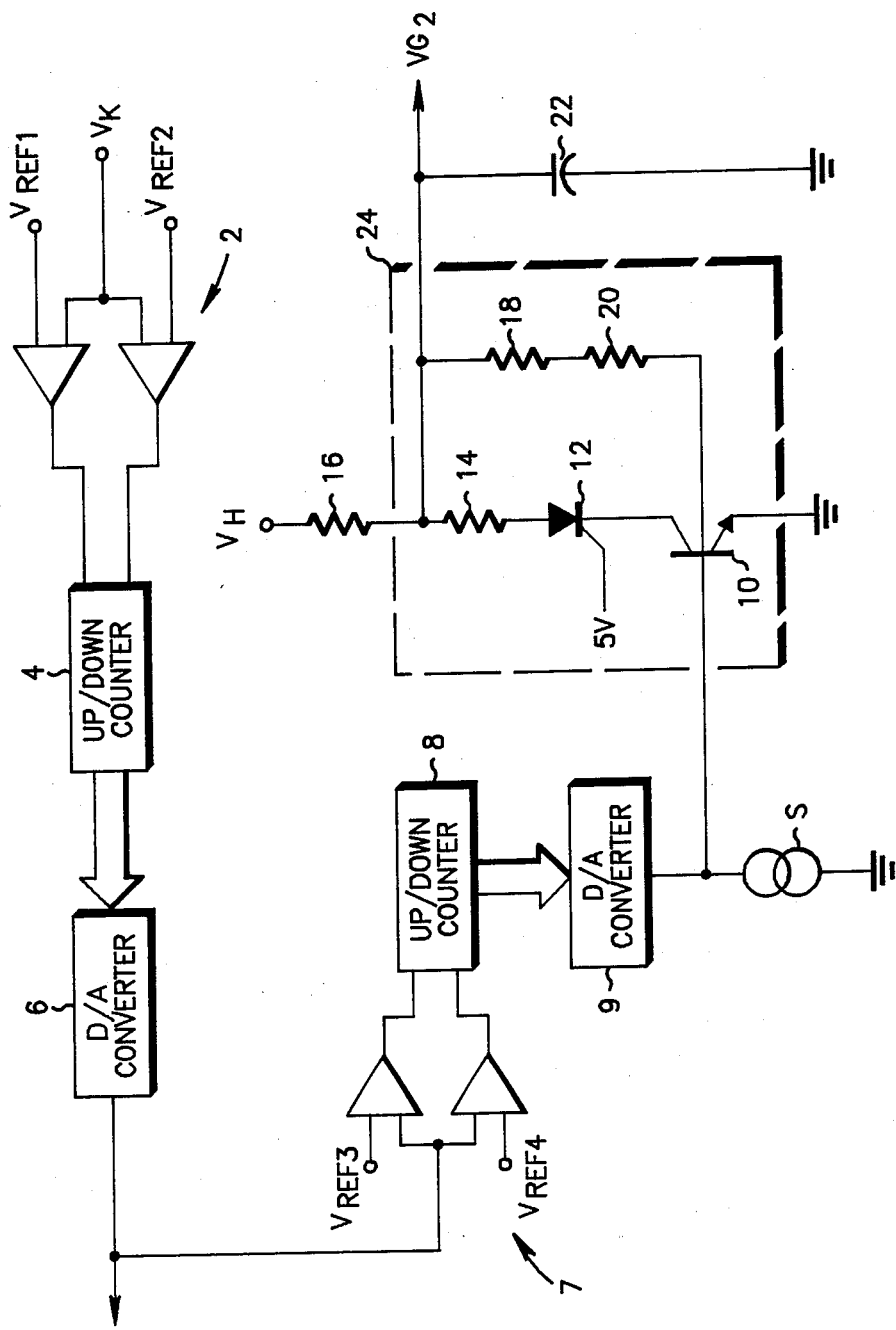

CRT CONTROL CIRCUIT

This invention relates to the control of cathode ray tubes (CRT's) and particularly, though not exclusively, to the control of CRT's in colour television receivers.

In use of CRT's and particularly colour CRT's the voltages and currents required to be applied to a CRT change both in the course of a single session of use (e.g. as the CRT "warms up") and during the life of the CRT as it ages. Thus it is desirable to monitor these signals while the CRT is in operation and adjust signals accordingly.

It is known to use such automatically adjusting loops to set the level of the tube cathode current at which the tube is nominally considered to be cut-off. However, such known loops may result in impractical cathode voltages.

It is an object of this invention to provide a circuit for controlling a cathode ray tube wherein the above-mentioned disadvantage may be overcome or at least alleviated.

In accordance with the invention, a circuit for controlling a cathode ray tube comprises:
control means for operatively monitoring tube parameters and adjusting the nominal cut-off level of the tube cathode current accordingly; and
means for sensing when the control means is near an extreme of its range of adjustment and
means responsive to the sensing means for changing a control signal applied to a grid of the tube so as to bring the nominal cut-off level control loop within its range of adjustment.

Preferably the changing means is arranged to change the voltage applied to the $G_2$ grid of the tube.

Preferably the changing means comprises a shunt feedback regulator connected in parallel with the voltage applied to the $G_2$ grid.

The shunt feedback regulator may be a high voltage transistor with resistive shunt feedback or preferably a low voltage transistor with a cascode high high voltage thyristor or triac.

One control cirucit in accordance with the invention for controlling a cathode ray tube will now be described, by way of example only, with reference to the accompanying drawing, which is a schematic block diagram of the circuit.

Referring now to the drawing, the control circuit includes a differential amplifier comparator arrangement 2 for operatively monitoring the cathode voltage $V_K$ of the cathode ray tube and for determining during the flyback period whether the cathode voltage is too low or too high.

The arrangement 2 provides two outputs respectively indicating that the cathode voltage is too high or too low with respect to predetermined reference voltages $V_{REF1}$ and $V_{REF2}$. The two outputs of the monitoring arrangement 2 are connected to an up/down counter 4 to increment the counter up or down respectively. The count of the counter 4 is applied in parallel as a multi-bit word to a digital-to-analog converter 6. The D/A converter 6 provides at its output a voltage which is representative of the required nominal cut-off level of the tube cathode current. The output of the D/A converter 6 is applied to tube cathode current generating circuitry (not shown).

The output of the D/A converter 6 is also applied to a differential amplifier camparator arrangement 7. The comparator arrangement 7 detects when the output of the D/A converter 6 is outside of a predetermined range with respect to predetermined reference voltages $V_{REF3}$ and $V_{REF4}$. This predetermined range is chosen so as to include substantially all of the range of adjustment provided by the up/down counter 4.

The comparator arrangement 7 provides two outputs respectively indicating that the present level of the cathode voltage $V_K$ is above or below the range of adjustment provided by the up/down counter 4. The two outputs of the comparator arrangement 7 are connected to an up/down counter 8 to increment the counter up and down respectively. The count of the counter 8 is applied as a multi-bit word to a digital-to-analogue converter 9. The output of the digital-to-analog converter 9 is connected to the control input of a shunt feedback regulator 24. The shunt feedback regulator 24 includes a low voltage transistor 10. The base of transistor 10 is also connected via a current source S to ground. The emitter of transistor 10 is connected to ground and the collector of transistor 10 is connected via a thyristor 12 and resistors 14 and 16 to a source of high voltage supply $V_H$, typically 8 KV. The base of the transistor 10 is also connected via resistors 18 and 20 to the mid-point of the resistors 14 and 16. The mid-point of resistors 14 and 16 is also connected via a capacitor 22 to ground. The mid-point of resistors 14 and 16 is also connected to the G2 electrode of the cathode ray tube.

Thus when the comparator arrangement 7 detects that the adjustment loop 2, 4, 6 is near an extreme of its range of adjustment, the comparator produces an output which accordingly controls the conduction of the transistor 10. In this way the voltage $VG_2$ is changed so as to bring the required nominal cut-off voltage level of the tube drive current back towards the centre of the range of adjustment of the adjustment loop 2, 4, 6.

It will be appreciated that the cascode arrangement of thyristor 12 and low voltage transistor 10 provides a simple, low cost alternative to using a single high power transistor as a shunt stabiliser for $VG_2$. It will, of course, be understood that a triac or a similar component may be used in place of the thyristor 12.

It will also be appreciated that in practice the functions of the up/down counters 4 and 8, and possibly also the functions of the D-to-A converters 6 and 9, may be collectively performed within a microprocessor (not shown).

It will also be appreciated that in a variant of the above described control circuit, instead of optimising the level of the cathode voltage $V_K$ so as to lie in the centre of the range of adjustment provided by the up/down counter 4, the cathode voltage $V_K$ may alternatively be optimised so as to be just within an extreme of its adjustment range so as to optimise tube performance in other known ways, for example, by setting $VG_2$ near to its maximum to give good focus of the tube.

It will also be appreciated that although the control circuit has been described above with reference to control of the voltage applied to the G2 grid of the tube, the voltages applied to the other grids of the tube may be alternatively or additionally controlled in accordance with the invention if so desired.

It will also be appreciated that substantially all of the (with the possible exception of the high voltage devices which may be more conveniently provided discretely) above described circuit may conveniently be incorporated in an integrated circuit device.

I claim:

1. A circuit for controlling a cathode ray tube comprising:
   a nominal cut-off control loop for operatively monitoring tube parameters and adjusting the nominal cut-off level of the tube cathode current accordingly within a predetermined range of adjustment;
   means for sensing when the nominal cut-off level control loop is near an extreme of its range of adjustment; and
   means responsive to the sensing means for changing a control signal applied to a grid of the tube so as to bring the nominal cut-off level control loop within its range of adjustment.

2. A circuit according to claim 1 wherein the changing means is arranged to change the voltage applied to the $G_2$ grid of the tube.

3. A circuit according to claim 1 or 2 wherein the changing means comprises a shunt feedback regulator connected in parallel with the voltage applied to the $G_2$ grid.

4. A circuit according to claim 3 wherein the shunt feedback regulator comprises a low voltage transistor with a cascode high voltage thyristor.

5. A circuit according to claim 3 wherein the shunt feedback regulator comprises a low voltage transistor with a cascode high voltage triac.

6. A circuit according to 1 claim wherein the changing means is so arranged as to bring the nominal cutoff level control loop to substantially an extreme of its range of adjustment.

7. An integrated circuit for controlling a cathode ray tube comprising:
   a cut-off control loop for operatively monitoring tube parameters and adjusting the nominal cut-off level of the tube cathode current accordingly within a predetermined range of adjustment;
   means for sensing when said cut-off level control loop is near an extreme of its range of adjustment; and
   means responsive to said sensing means for changing a control signal applied to a grid of the tube so as to bring said cut-off level control loop within its range of adjustment.

* * * * *